(12) United States Patent
Schwartzman et al.

(10) Patent No.: US 6,705,311 B1
(45) Date of Patent: Mar. 16, 2004

(54) RADIATION HEAT-SHIELD FOR SOLAR SYSTEM

(75) Inventors: Joel Schwartzman, Givatayim (IL); Shmuel Klapwald, Jerusalem (IL); Menashe Barkai, Tel Aviv (IL); Eli Mandelberg, Tel Aviv (IL); Avi Brenmiller, Tel Aviv (IL)

(73) Assignee: Solel Solar Systems Ltd., Jerusalem (IL)

( * ) Notice: Subject to any disclaimer, the term of this patent is extended or adjusted under 35 U.S.C. 154(b) by 196 days.

(21) Appl. No.: 09/987,106

(22) Filed: Nov. 13, 2001

(51) Int. Cl.⁷ .................................................. F24J 2/10
(52) U.S. Cl. ...................... 126/657; 126/652; 126/692; 126/708
(58) Field of Search ................. 126/201, 589, 126/570, 571, 652, 653, 654, 657, 684, 692, 693, 694, 695, 708; 138/106, 121, 110, 122; 285/45, 55, 226, 222.1

(56) References Cited

U.S. PATENT DOCUMENTS

| | | | | |
|---|---|---|---|---|
| 1,631,721 A | * | 6/1927 | Boischevalier | 165/76 |
| 1,946,184 A | | 2/1934 | Abbot | |
| 2,133,649 A | * | 10/1938 | Abbot | 126/608 |
| 2,547,746 A | * | 4/1951 | Cook | 285/45 |
| 2,886,885 A | * | 5/1959 | Reid, Jr. | 29/421.1 |
| 3,113,790 A | * | 12/1963 | Mattiessen | 285/45 |
| 3,834,741 A | * | 9/1974 | Drake | 285/226 |
| 3,837,685 A | * | 9/1974 | Miller | 285/45 |
| 3,901,539 A | * | 8/1975 | Ijzerman | 285/41 |
| 4,133,298 A | * | 1/1979 | Hayama | 126/591 |
| 4,159,712 A | * | 7/1979 | Legg | 126/584 |
| 4,186,725 A | | 2/1980 | Schwartz | |
| 4,202,322 A | * | 5/1980 | Delgado et al. | 126/574 |
| 4,216,980 A | * | 8/1980 | Shreve | 285/13 |
| 4,273,104 A | | 6/1981 | Uroshevich | |
| 4,281,637 A | * | 8/1981 | Wilson | 126/586 |
| 4,311,130 A | * | 1/1982 | Noose | 126/25 B |
| 4,326,503 A | | 4/1982 | Geier et al. | |
| 4,523,578 A | | 6/1985 | Mahdjuri Sabet | |
| 4,911,206 A | * | 3/1990 | Gropp et al. | 138/110 |
| 4,987,883 A | | 1/1991 | Watkins et al. | |
| 5,074,279 A | * | 12/1991 | Sainsbury | 126/25 B |
| 5,134,990 A | * | 8/1992 | Bradfield | 126/25 B |
| 5,471,783 A | * | 12/1995 | McLean | 47/30 |
| 6,109,661 A | * | 8/2000 | Cwik et al. | 285/45 |
| 6,155,250 A | | 12/2000 | Mieda et al. | |
| 6,324,870 B1 | | 12/2001 | Chabin et al. | |

FOREIGN PATENT DOCUMENTS

| | | |
|---|---|---|
| DE | 100 36 746 A1 | 1/2002 |
| EP | 0 286 281 A1 | 10/1998 |
| FR | 2 771 849 A1 | 6/1999 |

OTHER PUBLICATIONS

European Patent Office: Patent Abstracts of Japan, Abstract for JP 59021942, Takeru, "Heat Collecting Apparatus Utilizing Solar Heat" (Feb. 4, 1984).

European Patent Office: Patent Abstracts of Japan, Abstract of JP 60093252, Hiromitsu, "Solar Heat Collector" (May 25, 1985).

\* cited by examiner

*Primary Examiner*—Carl D. Price
(74) *Attorney, Agent, or Firm*—Browdy and Neimark, P.L.L.C.

(57) ABSTRACT

A solar system comprising a reflector and a heat collecting element (HCE) received at the focus of the reflector. The HCE comprises a coated tube received within a coaxial evacuated enveloping glass tube. The enveloping glass tube is secured at respective ends thereof to the coated tube by a coaxially deformable connector element having a distal end thereof sealingly secured to the coated tube and a proximal end thereof sealingly attached to a respective end of the enveloping glass tube by a glass to metal connection (GMC). A radiation shield assembly is provided over the connector element and over the GMC and is secured to the connector element by support legs engaging the connector element adjacent the proximal end.

30 Claims, 6 Drawing Sheets

RADIATION HEAT-SHIELD FOR SOLAR SYSTEM

FIELD OF THE INVENTION

The present invention is generally in the field of solar energy collecting systems of the so called focused collector type. More particularly, the invention is concerned with a radiation heat-shield for such collectors.

BACKGROUND OF THE INVENTION

Rapid exploitation of natural energy resources together with the search for environmental friendly energy resources and the need to provide energy to remote communities or plants raise an increase interest in solar energy systems and in improvements thereto. However, owing to considerations of economics and efficiency, commercial solar energy is still limited in use. Nevertheless, continuous research increases efficiency of such solar systems which gradually become more cost effective and render them more favorable.

Various types of solar collecting systems are known for converting solar energy into other forms of useful energy, by collecting the solar energy and transforming it into heat energy. The heat energy may then be consumed in various forms.

One particular type of solar systems is the so-called "focused collector type" wherein a beat collector element (HCE) is received at the focus of a reflecting member which in order to improve the angular radiation efficiency of the solar system, tracking means are provided for tracking the sun as it progresses in the sky. The HCE comprises a spatter coated tube with a liquid flowing therethrough, and in order to still improve the efficiency of the solar system, the coated tube is received within a coaxial translucent protective tube (typically made of durable glass) with a vacuum formed therein. Such systems are often referred to as ultimate vacuum collectors (UVAC).

The glass protective tube, protects the coated tube which is made of metal, coated with a layer of material having a high radiation absorbing coefficient and minimizes heat loss from the coated tube. A solar heat collector system is typically tens of meters long and occupies a large field. For practical reasons the solar system is constructed of aligned coated tube elements connected to one another so as to form a continuous line, whilst segments of the protective glass tubes extending over a major portion the coated tube elements, though they are not continuous.

The coated tubes and the protective tubes have different heat expansion coefficient, and accordingly the protective tubes are not continuous, since temperature changes would result in non-uniform expansion of the coated tubes and their respective protective tubes, resulting in severe damage to the system. Thus, it becomes necessary to sealingly couple the protective tubes over the coated tube utilizing a suitable device which provides some degree of freedom, in particular in an axial direction, so as to allow for different expansion of the glass tube over the metal coated tube, whilst retaining the vacuum within the protective tube.

Such an element is a bellows-type connector element having one axial end thereof sealingly secured over the coated tube and its opposed end co-axially connected to the protective tube by a so-called glass to metal connection, wherein the thickness of the respective end of the bellows is significantly reduced and has a diameter corresponding with that of the glass tube. By melting the end of the glass tube, the reduced thickness metal portion may be introduced into an edge of the molten glass tube whereby, its edges becomes overlapped by glass and in fact becomes sealingly welded thereto.

However, the zone of the glass to metal connection remains vulnerable and temperature changes may cause different expansion of the metal versus the glass components, resulting in loss of vacuum or even in rupturing of the envelope glass protective tube.

The problem of different expansion coefficient of glass and metal components may occurs in particular by concentrated or reflected radiation, which instead of being reflected towards the coated tube of the heat collecting element, are reflected to the glass to metal connection zone. A particular problem occurs when the sun is at low angles, where radiation is reflected towards one of the glass to metal connection zones of the HCE. For example, since it is most efficient to place the solar system such that a longitudinal axis of the HCE is positioned parallel with the meridian, i.e. extending in a north-south orientation, the problem of rays striking against the glass to metal connection zone occurs in the northern hemisphere mainly at the northern ends of each protective tube.

It is an object of the p invention to provide a radiation shield to protect the glass to metal connection zone from sunrays, direct or reflected, so as to prevent non-uniform expansion of glass and metal components at the connection zone.

SUMMARY OF THE INVENTION

According to the present invention there is provided a radiation shield for a solar system, to be attached to a connecting element sealingly retaining the protective tube over the heat collecting element, whereby the radiation shield is attached thereto in a manner and location which adequately shields the glass to metal connection zone in spite of axial displacement of the connecting element, also at extreme low radiation angles of the sun, of both direct and reflected sunrays, whilst interferes as little as possible with the effective collecting area of the HCE, so as not to deteriorate the overall efficiency of the solar system.

According to the present invention there is provided a solar system comprising a reflector with a beat collecting element (HCE) received at the focus of the reflector, said HCE comprising coated tube having a longitudinal axis extending between a first end and a second end; the coated tube being received within a coaxial evacuated enveloping glass tube; said enveloping glass tube being secured at respective ends thereof to the coated tube by a coaxially deformable connector element having a distant end thereof sealingly secured to the HCE and a proximal end thereof sealingly attached to a respective end of the enveloping glass tube by a glass to metal connection (GMC), wherein a radiation shield assembly extends over the connector element and over the GMC; said radiation shield assembly is secured to the connector element by support legs engaging the connector element adjacent the proximal end.

According to one embodiment of the invention, the shield assembly comprises an external unitary shield member extending over the deformation zone and the GMC zone. According to a different embodiment, the radiation shield assembly comprises a first eternal shield member extending from the proximal convolution towards the distal end of the connector element, and a second external shield member extending from the proximal convolution towards a corresponding end of the glass tube. Accordingly, the fit shield member shields the connector element and the second shield member shields the GMC zone.

One particular feature of the invention is to provide a radiation shield assembly comprising a first shield member extending over the connector element (deformation zone), and a second shield member extending over the transition zone and the GMC zone.

According to another aspect, the invention provides also an internal shield member extending between the HCE and the enveloping glass tube adjacent the GMC zone; said internal shield member intersecting the longitudinal axis. The internal shield member is in particular useful for shielding the glass to metal connection zone from rays reflected when the sun is at low angles.

The external shield members are formed, according to an embodiment of the invention, with a plurality of support legs, radially projecting inwardly. Said support legs, according to some embodiments of the invention, are integral with the external shield members. However, for the internal shield member, said support legs may be non integral with the shield ring and may be attached thereto in a manner imparting them radial biasing effect.

For best results, at least external surfaces of the shield assembly members are reflective, e.g. by means of a solar reflective coating agent, by suitable finishing (polishing) of high reflective solar metals, etc.

The invention is also concerned, by another of its aspects, with the construction of shield members and their manufacturing.

BRIEF DESCRIPTION OF THE DRAWINGS

In order to understand the invention and to see how it may be carried out in practice, some embodiments will now be described, by way of non-limiting examples only, with reference to the accompanying drawings, in which.

DETAILED DESCRIPTION OF SPECIFIC EMBODIMENTS

Figure 1A:
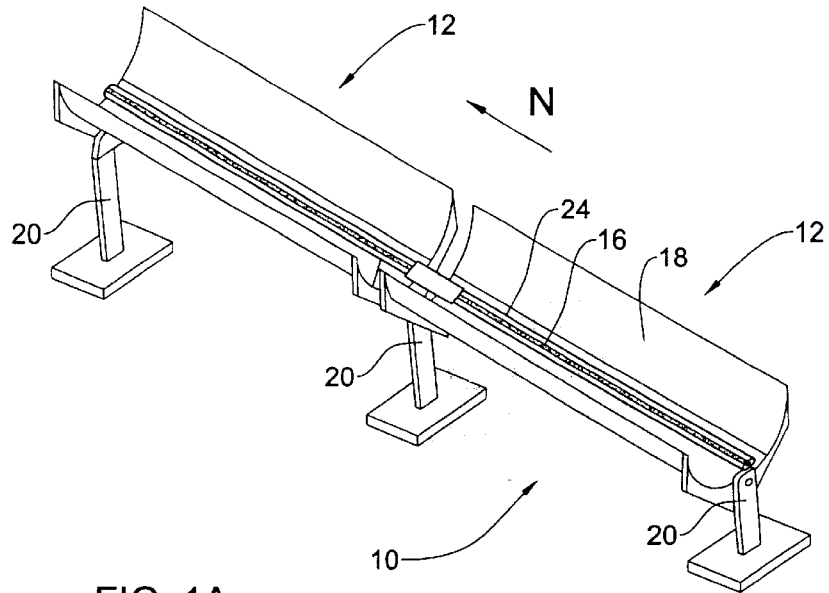
FIG. 1A is a schematic representation of a focused collector type solar system.

Attention is first directed to FIG. 1A of the drawings illustrating a solar connecting system generally designated 10. Such a solar system may be part of a solar field which may hold as many as hundreds of meters of collector units as in FIG. 1. The collector system comprises a plurality of coaxially aligned collector units 12, each comprising a heat collector element (HCE) fixed at the focus of a solar reflector 18, which in the present example is a trough-like reflector. Each solar unit 12 is mounted on support legs 20 with a tracking mechanism provided (not shown) for tracking the sun as it travels through the sky.

Figure 1B:
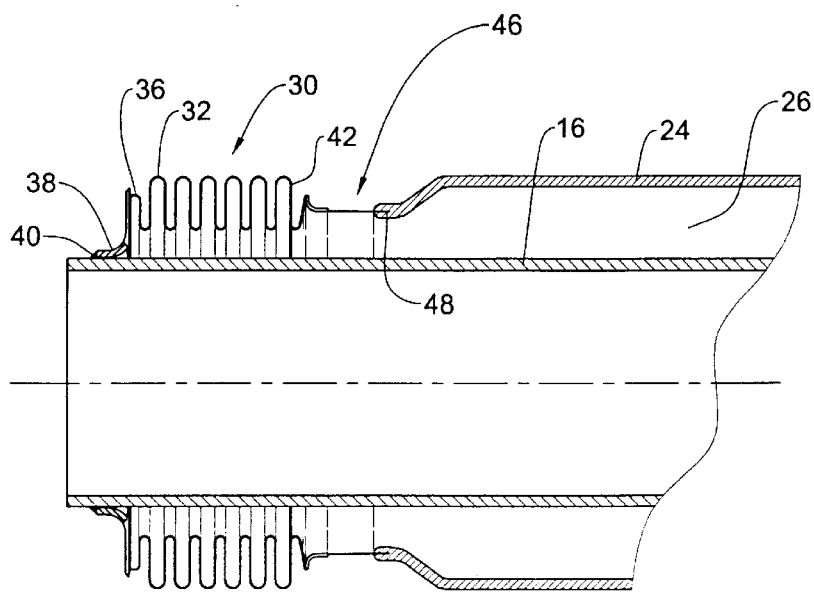
FIG. 1B is a sectioned view of a glass to metal connection of a solar unit in accordance wit prior art.

The heat collecting element (HCE) comprises a spatter coated tube 16 (coated with a radiation absorbing layer), the arrangement being such that where heat collecting elements of adjoining units 12 are coupled with one another, e.g. by welding with a heat collecting fluid flowing therethrough, In order to increase the thermal efficiency of the solar system and to protect the coated tubes, each tube 16 is coaxially received within a vacuumed protective glass tube 24. In order to keep the space 26 (FIGS. 1B, 3A, 3B) under vacuum, a suitable arrangement is provided for sealingly supporting the protective tube 24 over the coated tube 16, this being by means of a bellow-type connecting element generally designated 30, as seen in FIG. 1B. Connecting element 30 comprises a plurality of convolutions 32 with a most distal end 36 sealingly bearing against a retention ring 38 sealingly fixed aver the coated tube 16 by welding at 40. Accordingly, the distal end of the connecting element is axially fixed over the coated tube 16. Extending from a proximal convolution 42 of the connecting element there is a cylindric portion 46, coaxially extending with tube 16 and having a gradually reduced thickness. This section is referred to as a glass to metal connection zone. An end 48 of the tubular section 46 is significantly thin and has a diameter corresponding with a narrow portion 50 of the protective tube 24, whereby melting the end of the glass tube enables connection with the end 48 of the metal component, in a so-called glass to metal connection.

Figure 2A:
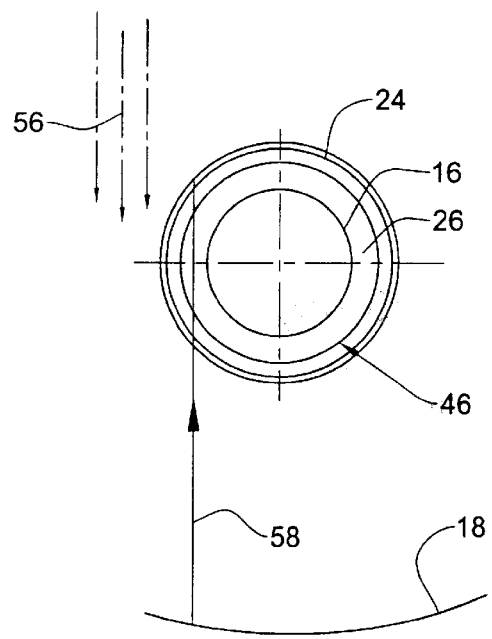
FIG. 2A is an enlargement of the northern end of a collector marked II in FIG. 1A, illustrating out of focus sunrays reflected from the collector's reflector towards the glass to metal connection.
Figure 2B:
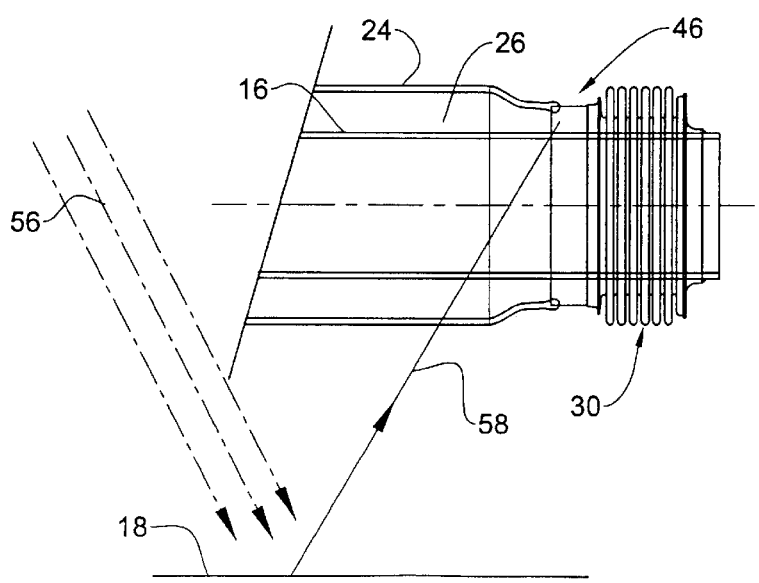
FIG. 2B is a side view of FIG. 2A illustrating sunrays reflected out of focus towards the glass to metal connection.

The connecting element 30 and the protective tube 24 have different expansion coefficients, whereby the connecting element 30 expands more than the glass protective tube 24. This expansion is axially absorbed by the convolutions of the connecting element 30. However, under extreme thermal conditions, the connecting element may fail to handle the expansion of the glass tube and of the connecting element which may result in severe damage to the collecting unit. This may occur in particular upon sunrays 56 concentrated or reflected, represented by line 58 in FIGS. 2A and 2B, reflected by the reflector 18.

Figure 3A:
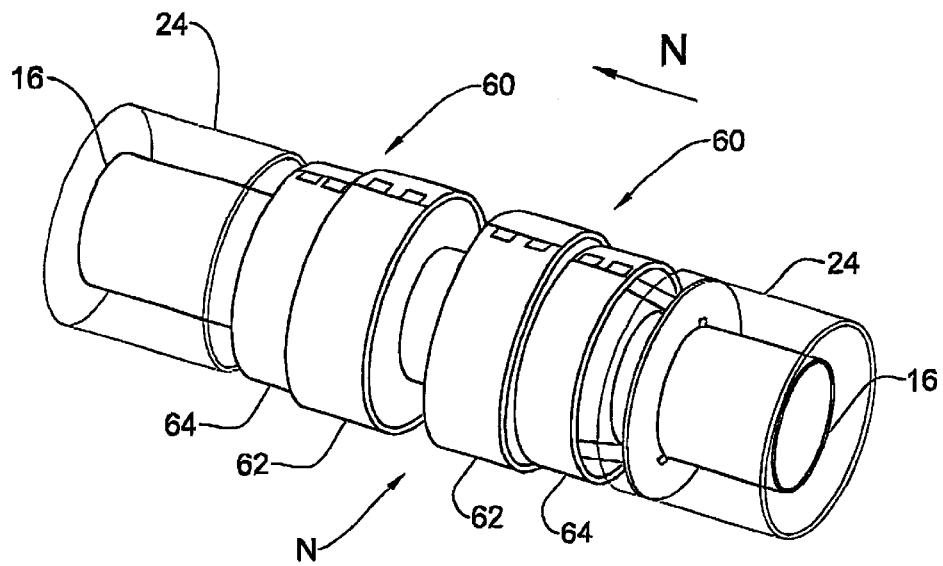
FIG. 3A is a perspective view of conjoining ends of heat collecting elements fitted with radiation shields in accordance with an embodiment of the present invention.
Figure 3B:
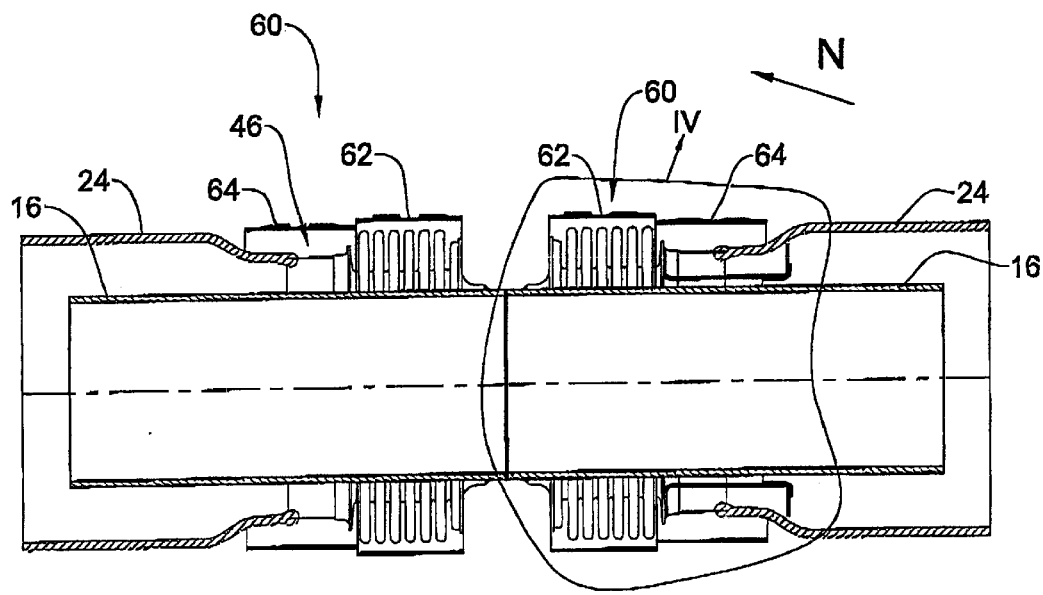
FIG. 3B is a longitudinal section through FIG. 3A.
Figure 4:
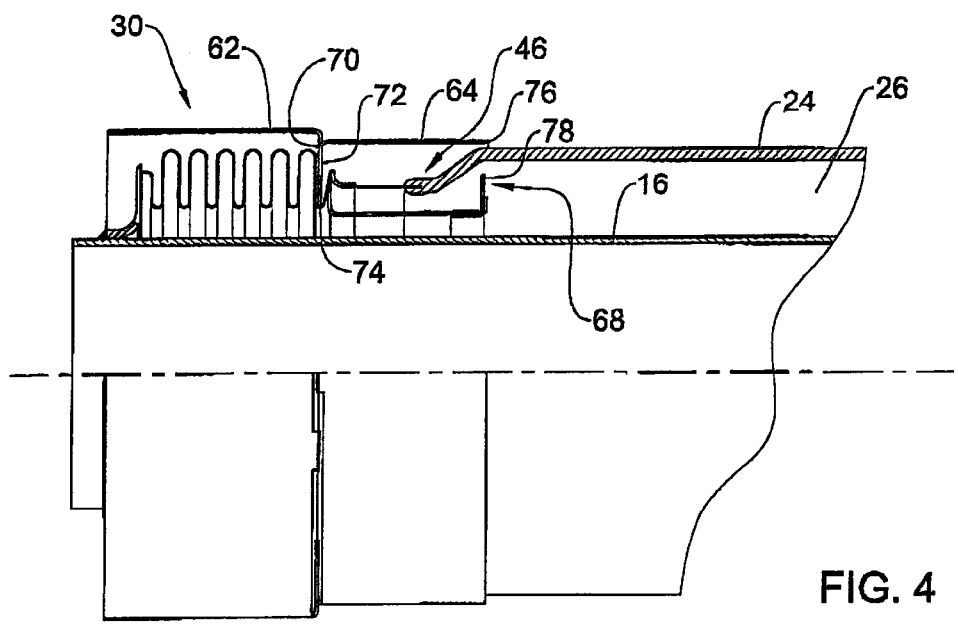
FIG. 4 is a partially sectioned view of the portion marked IV in FIG. 3B, illustrating an embodiment of a radiation shield in accordance with the present invention.

Overcoming the problem disclosed above is by providing a radiation shield assembly designated 60 in FIGS. 3A and 3B and in larger scale in FIG. 4.

The radiation assembly 60 comprises a first external shield member 62, a second external shield member 64 and an internal radiation shield member 68, provided only at the northern end of a collecting unit, namely at the right-hand connection in FIGS. 3A and 3B designated N and as can be seen also in FIG. 4. The internal shield member 68 is useful in particular when the sun is in a low position with rays being reflected at an oblique angle. This occurs for example at a northern end of the collector unit (mounted in a north-south orientation, in the northern hemisphere) and thus particular means are provided to block such radiation.

The first and second external radiation shields 62 and 64, respectively, are coaxial with the longitudinal axis of the coated tube 16 and the arrangement is such that the first shield member 62 shields the convolution section of the connecting element 30 and the second shield member 64 shields the glass to metal connection zone 46. The external shield members 62 and 64.

Preferably, the external surfaces (facing radiation) of the shield members are highly reflective, either by suitable finishing e.g. polishing of highly reflective metal or by coating, e.g. silver coating, so as to increase reflectivity and decrease heating of the shield members.

As best seen in FIG. 4, the external shield members 62 and 64 coaxially extend over the connecting element 30 and the glass to metal connection zone 46. The arrangement is such that both shield members have a plurality of support legs 70 and 72, respectively, radially extending and adapted for engagement with the most proximal convolution 74 of the connecting element 30. The arrangement is such that axial deformation of the connecting element 30 entails corresponding axial displacement of the shield members so as to mini the exposure of the connector element and the glass to metal connection zone to concentrated or reflected radiation, as well as to protect the connecting element 30 from environmental deterioration (increased oxidation, etc.).

The glass to metal connection zone is further protected by the internal radiation shield 68 which makes it possible to shorten the length of the second external shield member 64, thus avoiding interfering with the effective length of the protective glass tube 24 and the coated tube 16. Accordingly, the proximal end 76 of the second external shield member 64 and the radial portion 78 of the internal shield member axially co-extend.

Figures 5A, 5B:
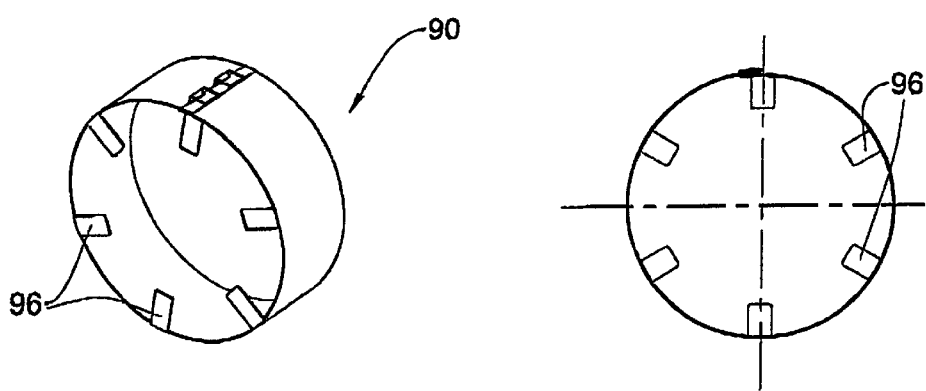
FIG. 5A is an isometric view of an eternal shield member in accordance with an embodiment of the present invention.
FIG. 5B is a side view of the shield member seen in FIG. 5A.
Figure 5C:
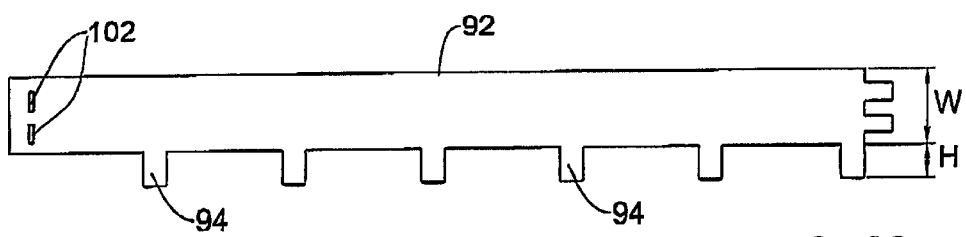
FIG. 5C is a spreading of the shield member of FIGS. 5A and 5B.

Further attention is now directed to FIGS. 5A–5C illustrating one particular embodiment of the external shield members. In fact, the same configuration is suitable for both the first and second external shield members, the only difference residing in the length and diameter thereof.

Such a shield member generally designated 90 is formed out of a flat strap of material 92 (FIG. 5C) formed with a plurality of projections 94 eventually constituting support legs 96 (FIGS. 5A and 5B) which are folded so as to radially extend inwardly. These support legs correspond with support legs 70 and 72 in FIG. 4.

The width W of the band 92 corresponds with the length of the respective first or second external shield member 64 and the height H of the projections 94 corresponds with the actual length of the support legs for bearing against the proximal convolution 74, as seen in FIG. 4.

The band 92 is further formed at a first end thereof with two slits 102 and an opposed end thereof is formed with two projections 104 whereby after bending projections 94 to extend normal to the surface of the bend 92 and then the shield member is formed so as to obtain its circular shape with the support legs engaging the proximal convolution, the shield member being fixed in its position by insertion of the projections 104 into slots 102 and bending the projections 104, similar to a bracing bend, as seen in FIG. 3A.

Figure 6:
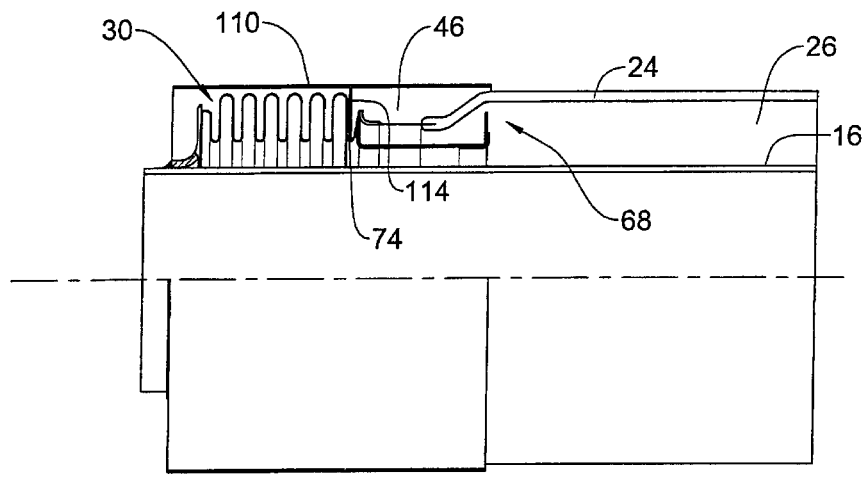
FIG. 6 is a partially sectioned view of another embodiment shielding a glass to metal zone in accordance with the present invention.

Another embodiment of an external shield member is illustrated in FIG. 6, wherein a uniform external shield member 110 is provided, the shield spanning the entire length of the connecting element 30 and the glass to metal connecting zone 46 with a plurality of radially extending support legs 114 for engagement with the proximal convolution 74 and supporting the shield member 110.

Figure 7A:
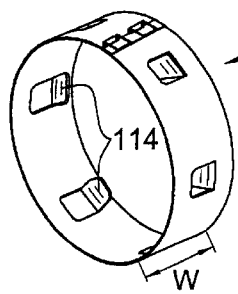
FIG. 7A is an isometric view of an external shield member used in accordance with the embodiment of FIG. 7.
Figure 7B:
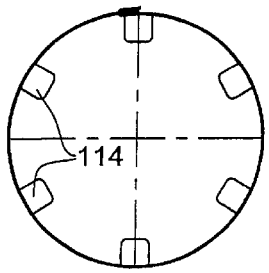
FIG. 7B is a side view of the shield member of FIG. 7A.
Figure 7C:
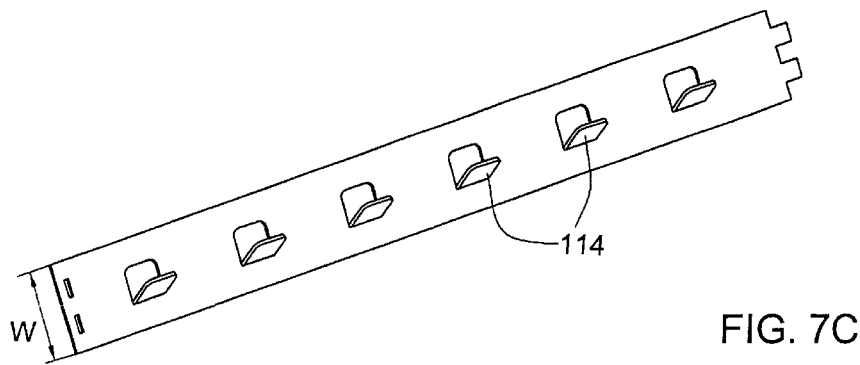
FIG. 7C is a spreading of the shield member of FIG. 7A.

FIGS. 7A–7C illustrate an embodiment of an external shield 110 as in FIG. 6, wherein the width W of the band 116 corresponds with the overall length of the connecting element 30 and glass to metal connection zone 46. In the particular embodiment illustrated in FIGS. 7A–7C the support legs 114 are integrally formed out of the band constituting the shield member by cut-outs formed therein. However, it will be appreciated that such support legs may also be formed by other means, e.g by point welding such radial projections as known per se.

Figure 8A:
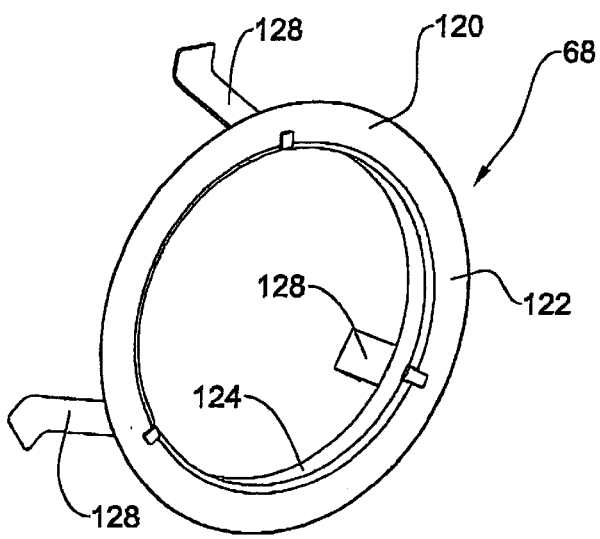
FIG. 8A is an isometric view of an assembly of an internal radiation shield member, in accordance with the present invention.
Figure 8B:
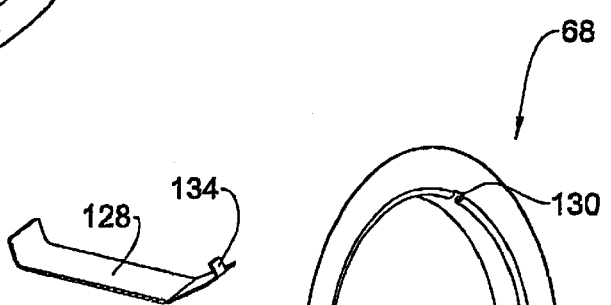
FIG. 8B is an exploded isometric view of the shield member of FIG. 8A.
Figure 8C:
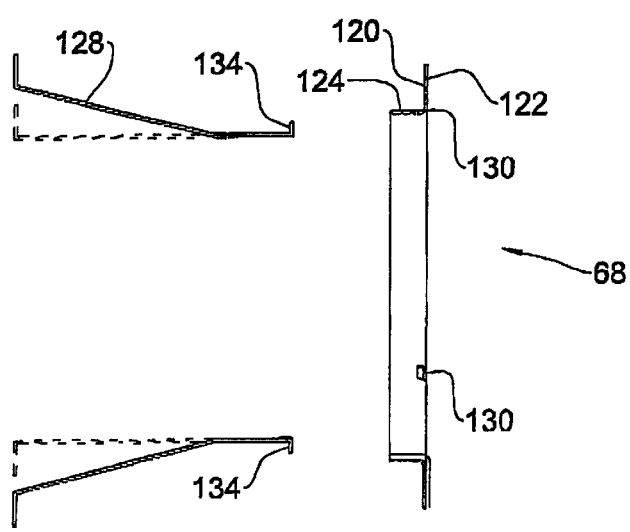
FIG. 8C is a side elevation of the shield member of FIG. 8A, illustrating by dashed lines the deformed position of the support legs of the shield member.

Further attention is now directed to FIGS. 8A–8C directed to the internal shield member 68. The interal shield member 68 is a ring-like element having an L-like cross-section with a first arm portion thereof 120 adapted for radially extending within the vacuumed space 26 (see FIGS. 1B, 4 and 6) which portion has an external reflective surface 122, e.g. by means of polishing, coating with a reflective material etc. The second leg portion 124 extends coaxially with the longitudinal axis of the heat collecting element and serves for supporting the biasing support legs 128. The ring is formed with three apertures 130 adapted for accommodating a hook portion 134 of each support leg 128.

In the assembled position, support legs 128 bear against the external surface of arm portion 124 whilst hook portion 134 is received within aperture 130. In this position the support legs are biased radially outwardly as in FIG. 8C, though they may be deformed into the position illustrated by dashed lines in FIG. 8C for insertion and engagement with a proximal convolution of the connection element 30 as illustrated in FIGS. 4 and 6, in a snapping manner.

As seen in these Figures, the internal shield member is intermediately received in the vacuum space 26 not being in contact with either the coated tube 16 or the protective tube 24 and it extends axially similar to the extent of the second external shield member 64.

What is claimed is:

1. A solar system comprising a reflector and a heat collecting element received at the focus of the reflector, said heat collecting element having a longitudinal axis extending between a first end and a second end; the heat collecting element comprising a coated tube received within a coaxial evacuated enveloping glass tube; said enveloping glass tube being secured at respective ends thereof to the coated tube by a coaxially deformable connector element having a distal end thereof sealingly secured to the coated tube and a proximal end thereof sealingly attached to a respective end of the enveloping glass tube by a glass to metal connection, wherein a radiation shield assembly extends over the connector element and over the glass to metal connection; said radiation shield assembly is secured to the connector element by support legs engaging the connector element adjacent the proximal end.

2. A solar system according to claim 1, wherein the deformable connector element is a bellows-type element comprising an axial deformation zone formed with several convolutions and a transition zone extending from a most proximal convolution to the glass to metal connection zone, wherein the support legs engage said most proximal convolution of the connector element.

3. A solar system according to claim 2, wherein the shield assembly comprises an external unitary shield member extending over the deformation zone and the glass to metal connection zone.

4. A solar system according to claim 2, wherein the radiation shield assembly comprises a first external shield member extending from the proximal convolution towards the distal end of the connector element, and a second external shield member extending from the proximal convolution towards a corresponding end of the glass tube.

5. A solar system according to claim 4, wherein the first shield member and the second shield member parallely extend with respect to the longitudinal axis of the heat collecting element.

6. A solar system according to claim 4, wherein at least an external surface of the first shield member and the second shield member is made of a reflective material.

7. A solar system according to claim 2, wherein the radiation shield assembly comprises a first shield member extending over the deformation zone, and a second shield member extending over the transition zone and the glass to metal connection zone.

8. A solar system according to claim 7, wherein the first shield member and the second shield member are secured to the connector element by support legs engaged to the same convolution.

9. A solar system according to claim 1, wherein the support legs are radial segments integrally formed with the shield member.

10. A solar system according to claim 2, wherein the radiation shield assembly comprises an internal shield member extending between the coated tube and the enveloping glass tube adjacent the glass to metal connection zone; said internal shield member intersecting the longitudinal axis.

11. A solar system according to claim 10, wherein the internal shield member comprising support legs engaged with the most proximal convolution of the connector element.

12. A solar system according to claim 11, wherein the internal shield member is a ring element having an L-like section, a first arm portion of which extending parallel to the coated tube and the other arm portion extending perpendicular thereto.

13. A solar system according to claim 12, wherein the internal shield member comprises support legs bearing against the first arm portion and radially biased outwardly so as to engage within the most proximal convolution of the connector element.

14. A solar system according to claim 10, wherein a distant end of the internal shield member and a distant end of a second shield member axially overlap one another.

15. A solar system according to claim 1, wherein the longitudinal axis of the heat collecting element is positioned so as to extend parallel with a meridian whereby the first end and the second end correspond with north and south, respectively.

16. A solar system according to claim 15, wherein both ends of the heat collecting element are fitted with a shield assembly.

17. A solar system according to claim 16, wherein at least the shield assembly at the second end of the heat collecting element is fitted with an internal shield member extending between the coated tube and the enveloping glass tube adjacent the glass to metal connection zone; said internal shield member intersecting the longitudinal axis.

18. A solar system according to claim 1, wherein at least an external surface of the shield assembly members is reflective.

19. A radiation shield assembly for a solar system of the type comprising a reflector with a heat collecting element received at the focus of the reflector, said heat collecting element comprising a coated tube with a longitudinal axis extending between a first end and a second end; the coated tube being received within a coaxial evacuated enveloping glass tube; said enveloping glass tube being secured at respective ends thereof to the coated tube by a coaxially deformable connector element having a distant end thereof sealingly secured to the coated tube and a proximal end thereof sealingly attached to a respective end of the enveloping glass tube by a glass to metal connection; wherein said radiation shield assembly extends over the connector element and over the glass to metal connection and said radiation shield assembly is secured at one end thereof to the connector element by support legs engaging the connector element adjacent its proximal end whereby axial deformation of the connecting element entails a corresponding displacement of the radiation shield.

20. A radiation shield assembly according to claim 19, wherein the support legs engage a most proximal convolution of the connector element.

21. A radiation shield assembly according to claim 20, comprising a first shield member extending from the proximal convolution towards the distal end of the connector element, and a second shield member extending from the proximal convolution towards a corresponding end of the glass tube.

22. A radiation shield assembly according to claim 21, wherein the first shield member and the second shield member are secured to the connector element by support legs engaged to the same convolution.

23. A radiation shield assembly according to claim 20, comprising a first shield member extending over a deformation zone of the connector element, and a second shield member extending over a transition zone of the connector element and the glass to metal connection zone.

24. A radiation shield assembly according to claim 19, comprising a unitary shield member extending over an axial deformation zone of the connector element and over the glass to metal connection zone.

25. A radiation shield assembly according to claim 19, wherein the shield member is a band of material formed into a closed ring-like shape and secured in this position; said shield member integrally comprise a plurality of support legs radially extending inwardly.

26. A radiation shield assembly according to claim 19, wherein at least an outer surface of shield member of the assembly is highly reflective.

27. A radiation shield assembly for a solar system of the type comprising a reflector with a heat collecting element received at the focus of the reflector, said heat collecting element comprising a coated tube with a longitudinal axis extending between a first end and a second end;

the coated tube being received within a coaxial evacuated enveloping glass tube;

said enveloping glass tube being secured at respective ends thereof to the coated tube by a coaxially deformable connector element having a distant end thereof sealingly secured to the coated tube and a proximal end thereof sealingly attached to a respective end of the enveloping glass tube by a glass to metal connection;

wherein said radiation shield assembly extends over the connector element and over the glass to metal connection;

said radiation shield assembly is secured to the connector element by support legs engaging the connector element adjacent the proximal end, and further comprising an internal shield member extending between the coated tube and the enveloping glass tube adjacent the glass to metal connection zone;

said internal shield member intersecting the longitudinal axis.

28. A radiation shield assembly according to claim 27, wherein the internal shield member comprises support legs to be engaged with the most proximal convolution of the connector element.

29. A radiation shield assembly according to claim 27, wherein the internal shield member is a ring element having an L-like section, a first arm portion of which extending parallel to the heat collecting element and the other arm portion extending perpendicular thereto.

30. A radiation shield assembly according to claim 29, wherein the internal shield member comprises support legs bearing against the first arm portion and radially biased outwardly so as to engage within the most proximal convolution of the connector element.

* * * * *